United States Patent
Licardi et al.

(10) Patent No.: US 7,792,721 B2
(45) Date of Patent: Sep. 7, 2010

(54) SYSTEM AND METHOD FOR APPROVAL AND ALLOCATION OF COSTS IN ELECTRONIC PROCUREMENT

(75) Inventors: Courtney A. Licardi, Peoria, AZ (US); Sarah E. Harvey, Phoenix, AZ (US); Eric C. Saur, Scottsdale, AZ (US); Pamela G. Urbank, Glendale, AZ (US); Michael K. Vo, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 963 days.

(21) Appl. No.: 11/167,230

(22) Filed: Jun. 28, 2005

(65) Prior Publication Data

US 2007/0192218 A1 Aug. 16, 2007

(51) Int. Cl.
*G07F 19/00* (2006.01)
(52) U.S. Cl. .................................................. 705/35
(58) Field of Classification Search ............... 705/1–45, 705/400, 51, 67; 370/466; 213/153; 273/292; 379/211; 380/201, 233; 455/406; 463/18; 707/694; 709/219
See application file for complete search history.

(56) References Cited

U.S. PATENT DOCUMENTS

| | | | | |
|---|---|---|---|---|
| 6,381,587 B1* | 4/2002 | Guzelsu | ........................ | 705/40 |
| 2002/0087441 A1* | 7/2002 | Wagner et al. | ................. | 705/30 |
| 2002/0145040 A1* | 10/2002 | Grabski, III | ................. | 235/385 |
| 2003/0204458 A1* | 10/2003 | Carroll et al. | .................. | 705/35 |
| 2003/0220855 A1* | 11/2003 | Lam et al. | ...................... | 705/34 |
| 2004/0153424 A1* | 8/2004 | Lussow et al. | .............. | 705/400 |
| 2004/0186798 A1* | 9/2004 | Blitch et al. | .................. | 705/29 |
| 2004/0210526 A1* | 10/2004 | Brown | ......................... | 705/40 |
| 2005/0147119 A1* | 7/2005 | Tofano | ........................ | 370/466 |
| 2005/0246274 A1* | 11/2005 | Abbott et al. | ................. | 705/40 |

OTHER PUBLICATIONS

Accounts Payable Automation Pays Dividends, Furth, David, CPA Journal v75n7 pp. 16, Jul 2005.*
Method and System for Processing Transactions, Notiva Corporation, Dec. 30, 2003.*
Ariba Supplier Network, Ariba Inc., pp. 2-4, (Jul. 28, 2004) available at: http://www.ariba.com/pdf/ARI_Buyer_Brch.pdf.
Ariba Buyer, Ariba Inc., pp. 1-2, (Jul. 28, 2002) available at: http://www.ariba.com/pdf/AribaBuyer.pdf.
Eliminate Invoice Paperwork with OB10, OB10, pp. 2-5, (Sep. 24, 2004) available at: http://www.ob10.com/Docs/OBE%20OB10%20Brochure.pdf.

* cited by examiner

*Primary Examiner*—James P Trammell
*Assistant Examiner*—Tien C Nguyen
(74) *Attorney, Agent, or Firm*—Snell & Wilmer L.L.P.

(57) ABSTRACT

A system, method and computer program product for approval and allocation of costs in electronic procurement is described, wherein approval and allocation of costs are made in response to an electronic invoice, which includes information used to allocate procurement costs to one or more cost centers.

15 Claims, 8 Drawing Sheets

FIG. 1

Create New Invoice elnvo

200

Supplier Details:

| | | Ship From Address | Ship To Address |
|---|---|---|---|
| Address Name | Optional | Ship From Address | OTH |
| Deliver To | Optional | | |
| Street 1 | Optional | | |
| Street 2 | Optional | | |
| Street 3 | Optional | | |
| City | Optional | | ML |
| State/County | Optional | | |
| Postcode | Optional | | 00000 |

202

Invoice Details: — 205

| | |
|---|---|
| Invoice # — 206 | Required |
| Invoice Date — 207 | Required |
| Contract # | Required | 1/25/2005 |
| Previous Invoice # | Optional |

204

| Service Request Type | Required | PLEASE SELECT A VALUE |
|---|---|---|

208

| | | |
|---|---|---|
| Sub Total — 211 | Calculated | $0.00000 |
| Total Tax — 212 | Calculated | $0.00000 |
| Total Freight — 213 | Calculated | $0.00000 |
| Amount Due — 214 | Calculated | $0.00000 |

210

| Comments | Optional |
|---|---|

FIG. 2A

| Line # | Allocation Code | Transaction Date | Item Code | Item Description | Unit of Meas. | Qty | Unit Price | Line Total | Tax Amount | Freight |
|---|---|---|---|---|---|---|---|---|---|---|
| Auto Populate | Required | Required | Required | Required | Required | Required | Required | Calculated | Optional | Optional |
| | | | | | | | | | | |
| | | | | | | | | | | |
| | | | | | | | | | | |
| | | | | | | | | | | |
| | | | | | | | | | | |
| | | | | | | | | | | |
| 222 | 224 | 226 | 227 | 228 | 230 | 232 | 234 | 236 | 238 | 240 | elnvo — 220

Validate Invoice | Submit Invoice | Save As Draft

SYSTEM AND METHOD FOR APPROVAL AND ALLOCATION OF COSTS IN ELECTRONIC PROCUREMENT

BACKGROUND OF THE INVENTION

1. Field of the Invention

The present invention generally relates to approval and allocation of costs associated with purchases against a procurement contract, and more particularly to receiving an electronic invoice, and validating the invoice including validation of rate information contained in the invoice with information from the procurement contract, and allocating costs.

2. Related Art

Electronic procurement, or e-procurement, provides a mechanism to purchase goods and services electronically. Using a network of computers, such as the Internet, a buyer can place an order for a good and/or service, typically by accessing a supplier's web. Thus, purchasing within an organization can be made easier at least on the front end. However, of course, a purchase has an associated request for payment, which is typically in the form of an invoice received from the supplier. Before a supplier's invoice is paid, the organization for which the buyer made the purchase must validate the information contained in the invoice.

In a case that the invoice can be matched to a purchase order, the process of validating the invoice is made easier, since the purchase order, and the purchase itself, typically went through an approval process before it was sent to the supplier. Before a purchase order is submitted by the buyer for approval, the buyer completes the purchase order, which typically includes such information as the supplier's name and address, a description of the item to be purchased, together with price and quantity. The purchase order also typically includes the buyer's name and department within the organization. This latter information is used to allocate the costs associated with the purchase. The completed purchase order is reviewed, and if approved is submitted to the supplier to make the purchase. Upon receipt of the purchase order, the supplier fills the order and submits a request for payment. The request for payment is typically in the form of an invoice, and usually includes the purchase order, or some reference, e.g., a purchase order number, to the purchase order.

The purchase order is used by the organization to verify the contents of a received order. In addition, when the supplier submits the invoice, the invoice is compared to the purchase order to verify the information contained in the supplier's invoice.

However, in a decentralized procurement environment, buyers in departments within an organization may be permitted to make a purchase by directly contacting the supplier without first completing a purchase order and obtaining pre-purchase approval. In such a case, a supplier's invoice is typically the organization's notification of the procurement. In addition, the invoice is usually received by a department, other than the buyer's department, which has the centralized task of reviewing and approving the supplier's invoice for payment. While a type of procurement of a good or service which involves a decentralized purchase without a purchase order against a contract facilitates the procurement, this type of procurement makes it difficult to validate an invoice for approval and payment, typically a centralized task.

To illustrate, using the following example, an organization has an existing procurement contract with a credit bureau to provide demographic data, such as with a market list service, to be used within the organization. A buyer in a department associated with a specific cost center within the organization contacts the credit bureau to request the market list service. Other buyers associated with other cost centers may also use the market list service, or another service provided by the credit bureau. In addition, in making the purchase, the buyer may represent more than one cost center. The credit bureau submits an invoice using a centralized destination within the organization to request payment for each of the services that it performed over a period of time. At that time, the information contained in the invoice must be validated, and the appropriate cost center(s) charged for the costs associated with the procurement.

Since the request for the market list service need not be submitted to the supplier with a purchase order, the supplier's invoice may not include typical information (e.g., a purchase order number, pricing, buyer's department, etc.) used to validate and allocate the costs identified by the invoice. In addition, the invoice received from the supplier is typically in a non-standard form.

In order to approve the invoice for payment, the items contained in the invoice must be identified and matched to a contract rate to ensure that the invoice rate charged by the supplier matches the contract rate. In addition, the costs associated with the services identified in the invoice must be allocated to the appropriate cost center, or cost centers.

To facilitate the procurement process, the organization may use an online procurement tool for goods and services. One example of such a tool is called Ariba Buyer, which is provided by Ariba, Inc. In addition, Ariba Inc. offers software, Ariba Contract, which provides an online repository of contracts and rate cards, and Ariba Invoice, used for processing invoices. However, existing electronic procurement tools do not have an efficient mechanism for receiving and processing an electronic procurement invoice, which is not backed by a purchase order. In addition, these electronic procurement tools do not provide backend processing for allocating costs to the appropriate cost center(s).

Given the foregoing, what is needed is a system, method and computer program product for approval and allocation of costs in electronic procurement.

BRIEF DESCRIPTION OF THE INVENTION

The present invention meets the above-identified needs by providing a system, method and computer program product for approval and allocation of costs in electronic procurement.

In accordance with one embodiment of the invention, centralized approval and allocation of costs associated with purchases against a pre-existing electronic procurement contract is provided in an organization having a number of cost centers. An electronic invoice is submitted by a supplier of a good and/or service as a request for payment for the good and/or service procured by a buyer in the organization. The electronic invoice submitted by the supplier includes a number of input fields, at least one of which is used for allocation of costs associated with the procurement. Once submitted, the electronic invoice undergoes a set of validations to validate the information contained therein. In a case that the electronic invoice's information is successfully validated, it is then matched with the pre-existing electronic procurement contract, and rate information included in the electronic invoice is validated against a contract rate from the electronic procurement contract. The validated information from the electronic invoice, including the cost allocation information and the rate information, is used to allocate costs associated with procurement to appropriate cost center(s) within the organization.

An advantage of the present invention is that it facilitates post-procurement approval of costs associated with an electronic procurement, including non-purchase-order-backed procurement, based on information contained in an invoice and a pre-stored contract.

Another advantage of the present invention is that it facilitates identification of the cost centers to which procurement costs are to be allocated.

Yet another advantage of the present invention is that there is no need to require a purchase order, or other pre-procurement approval document.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIG. 2, which comprises

FIG. 4, which comprises

DETAILED DESCRIPTION

I. Overview

The present invention is directed to a system, method and computer program product for approval and allocation of costs in electronic procurement. The present invention is now described in more detail herein in terms of an exemplary electronic procurement system. This is for convenience only and is not intended to limit the application of the present invention. In fact, after reading the following description, it will be apparent to one skilled in the relevant art(s) how to implement the following invention in alternative embodiments.

To illustrate, the invention is described with reference to a multi-party procurement, i.e., a supplier, a buying organization and a buyer within the buying organization. While the invention is described with reference to a single supplier, buyer and buying organization, it should be apparent that the present invention is applicable to any number of buying organizations, each of which has multiple suppliers and/or buyers. In addition, the present invention is described with reference to decentralized procurement, e.g., multiple buyers within the buying organization procuring items, it should be apparent that the present invention would also be applicable to centralized procurement. Further in this regard, the present invention is described with reference to centralized invoice approval and payment, and allocation of the associated costs. However, it should be apparent that the present invention has applicability to decentralized invoice approval and payment, and allocation of costs.

II. System

Figure 1:
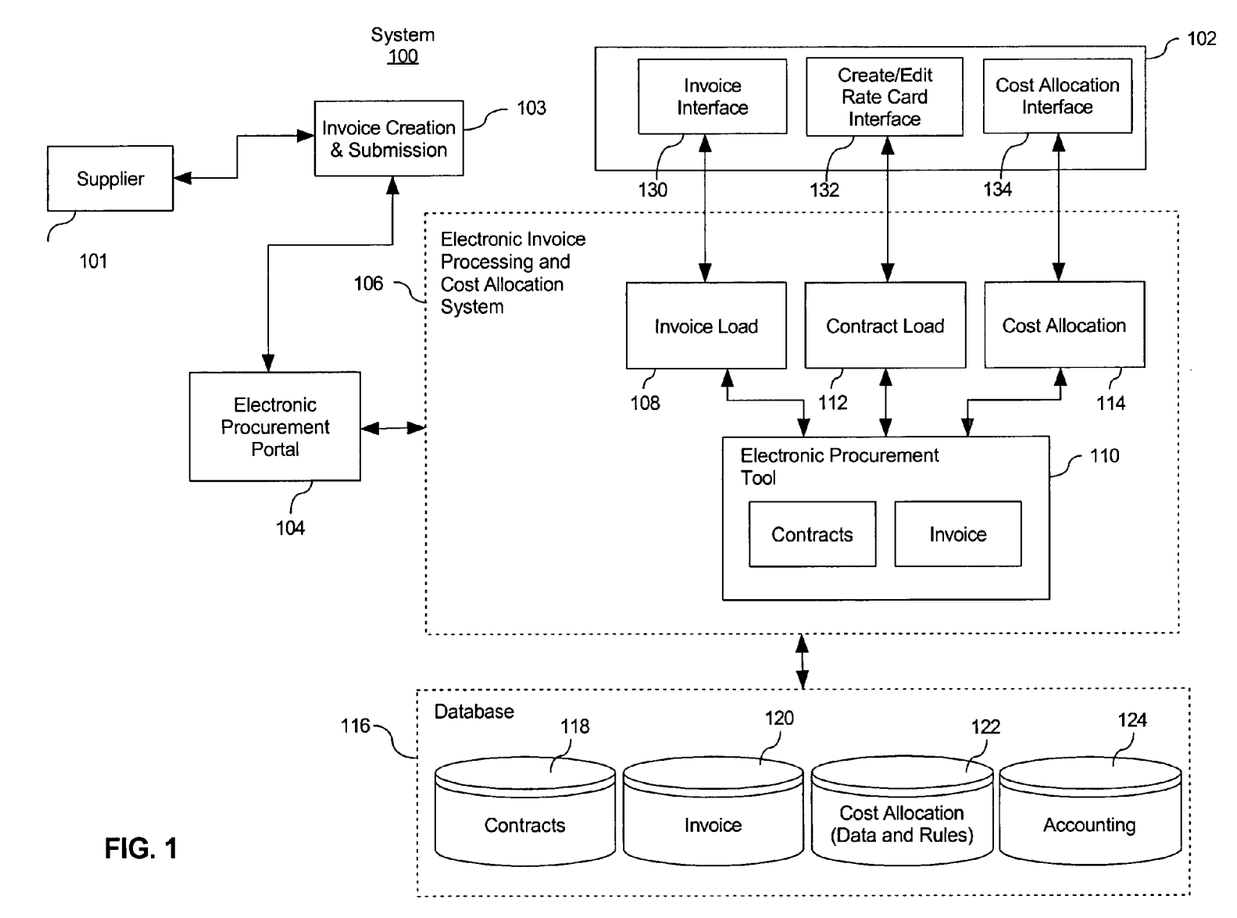
FIG. 1 is a system diagram of an exemplary electronic procurement system architecture in which the present invention, in an embodiment, would be implemented.

Referring to FIG. 1, a system diagram of an exemplary electronic procurement system 100 in which the present invention, in an embodiment, would be implemented is shown.

System 100 includes a user interface 102 comprising invoice interface 130, create/edit rate card interface 132, and cost allocation interface 134 used by the procuring organization. In addition, system 100 includes a supplier-side user interface 103 used by supplier 101 to create and submit an invoice to the procuring organization. Supplier 101 contracts with the organization to supply goods and/or services to the organization. A good or service is hereinafter generally referred to as a product or an item. Multiple buyers within the organization can contact supplier 101 to make a purchase, which may, but need not, be pre-approved (such as with a purchase order). The request may be made online, via the Internet, for example. To obtain payment for the item supplied to the buyer, supplier 101 accesses system 100 via supplier-side user interface 103.

In the exemplary embodiment, supplier-side user interface 103 uses a spreadsheet application, such as Microsoft Excel 2000 to generate the user interface. However, it should be apparent that other software applications can be used to generate supplier-side user interface 103. Using Microsoft Excel, supplier-side user interface 103 is generated as a spreadsheet document, which includes multiple window displays, and which includes fields for entering invoice information.

As is discussed in more detail below, with reference to FIG. 2, the supplier-side user interface 103 allows a supplier 101 to create an electronic invoice, and to enter invoice information, including supplier information, cost information, line item detail, and allocation information. After entering the invoice information, supplier-side user interface 103 allows the supplier 101 to validate the invoice, submit the invoice to the buying organization for payment, or save the invoice as a draft, for example. Upon submission for payment and/or validation, the invoice is parsed and submitted via an electronic procurement portal 104 to electronic invoice processing and cost allocation system (EIPCAS) 106. According to this exemplary embodiment, the invoice is submitted in a cXML (commerce extended markup language) format, which is based on an open standard for communicating commerce-related data across the Internet. However, it should be apparent that other electronic data formats may be used.

EIPCAS 106 includes invoice load 108, electronic procurement tool 110, contract load 112 and cost allocation 114. In addition to validating an invoice, processing an invoice for payment, and allocating procurement costs, EIPCAS 106 updates and retrieves data stored in database 116, which includes stored contract 118, invoice 120, cost allocation 122, and accounting 124 information.

Examples of the information stored in database 116 will now be described.

Figure 2A:
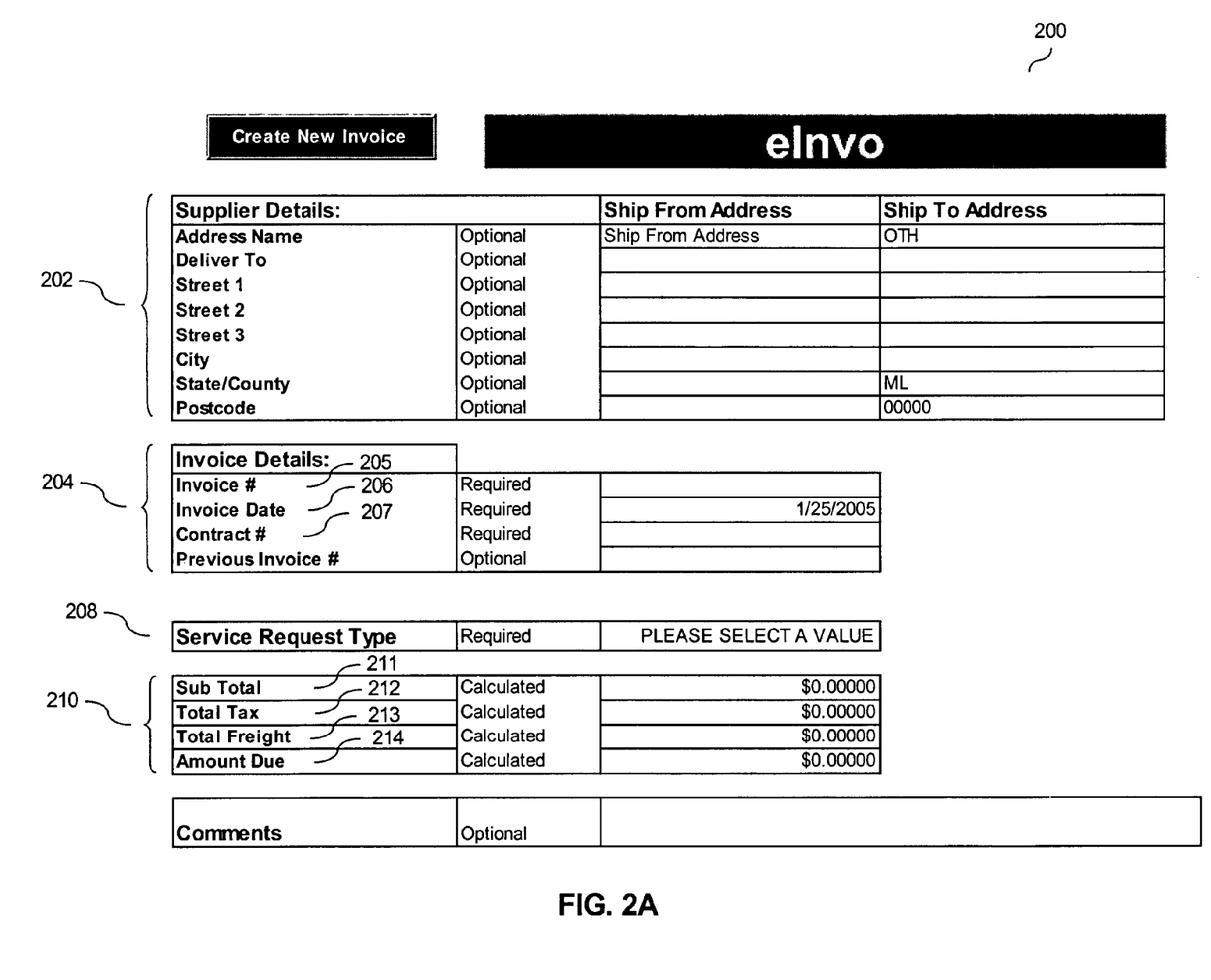
FIGS. 2A and 2B, shows exemplary windows, or screen shots, of a supplier-side user interface generated by the graphical user interface of the present invention.
Figure 2B:
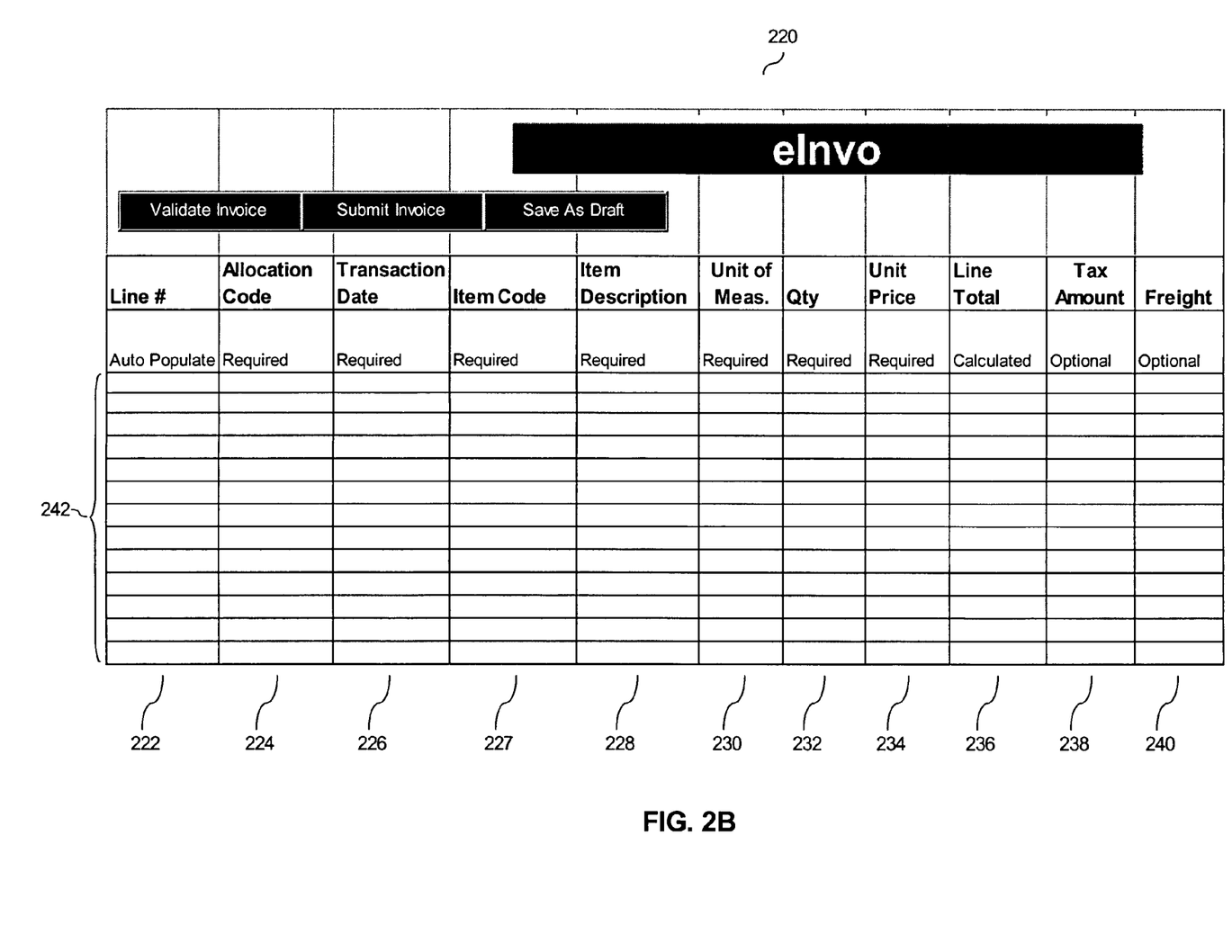

Invoice 120 includes information entered using supplier-side user interface 103. FIG. 2, which comprises FIGS. 2A and 2B, shows exemplary windows, or screen shots, of user interface 103 generated by the supplier-side user interface 102 of the present invention.

Referring to FIG. 2A, window 200 includes supplier information section 202 for entering supplier identification information, such as the supplier's name and address. Invoice section 204 includes an invoice number 205 for entering an invoice identifier, invoice date 206 for entering a date of the invoice, and a contract number 207 for entering a contract identifier. Service request type 208 further identifies the item(s) purchased, and includes values such as online, batch and other. The service request type 208 can be used to dynamically alter the fields displayed in the supplier-side user interface 103.

Cost section 210 of window 200 includes fields for entering the total amount due shown in field 214 for all of the items supplied by supplier 101 identified in the electronic invoice. The total amount due shown in field 214 is based on the amounts identified in subtotal field 211, which identifies a subtotal for the supplied items, excluding tax and freight, which are identified in fields 212 and 213, respectively. Thus, field 214 identifies an amount due, which is a sum of the amounts identified in fields 211 to 213.

Referring to FIG. 2B, window 220 includes line item detail for each of the supplied items, for which payment is requested by the supplier 101. More particularly, each line item entered in line item detail section 242 is identified by a line item number 222, allocation code 224, transaction date 226, item code 227, item description 228, unit of measure 230, quantity 232, unit price 234, line item total 236, line item tax 238 and line item freight 240. Allocation code 224 is used to identify an allocation rule for allocating the costs, as identified by the fields 236, 238 and 240, to at least one cost center. Supplier 101 supplies the allocation code 224, which may be provided by the buyer as part of the request for the good and/or service. Alternatively, the allocation code 224 may be provided to the supplier 101 in another manner, such as with the contract.

Reverting to FIG. 1, Contracts 118 of database 116 includes the supplier's 101 rate card(s). Under control of contract load 112, user interface 102 generates a creation/edit rate card user interface 132 to input rate card information, which is stored in contracts 118. Each rate card identifies the supplier. In addition, a rate card identifies at least one item (e.g., a good or service). Each item identified in the rate card has identifying information, such as an item code and a item description, unit of measure, and a negotiated unit price, or rate, identified in the rate card. The negotiated rate may be a flat rate or volume-tiered, rate, for example.

Cost allocation 122 includes a mapping between allocation code and one or more allocation rules, each of which are used to identify the cost center to allocate the cost to one or more cost centers. A cost center is associated with one or more business units, e.g., departments. A status associated with an allocation code can be used to determine whether an allocation code is in effect. An allocation code is also associated with the supplier 101.

Each allocation rule has an associated effective date, which is examined in selecting an allocation rule to allocate costs identified in the electronic invoice to one or more cost centers. More particularly, as is discussed more fully below, an allocation rule having an effective date equal to or prior to the date on which the invoice is being processed is selected to allocate costs to a cost center. Where more than one allocation rule is associated with an allocation code, those allocation rules having an effective date prior to the current, or processing, date are identified, and an appropriate allocation rule is selected, as is discussed in more detail below.

An allocation rule identifies each cost center using a cost center identifier and identifies the percentage (i.e., value greater than zero and less than or equal to one hundred) to be used to allocate cost to the identified cost center. An allocation code and associated rule are entered via the cost allocation interface 134. The allocation rule is validated by cost allocation 114 to ensure that a valid cost center identifier is used, together with a valid percentage. Where more than one cost center is identified by an allocation rule, a validation is performed by cost allocation 114 to ensure that the aggregate percentage does not exceed one hundred percent.

In a case that one cost center is identified by the selected allocation rule, the cost is allocated to the cost center identified by the allocation rule. In a case that the allocation rule identifies multiple cost centers, the cost is allocated to each identified cost center in accordance with cost center percentages identified by the selected allocation rule.

Once the supplier 101 submits an electronic invoice with the information entered via windows 200 and 220, invoice load 108 examines the information contained in the electronic invoice. For each line item entered in window 220, invoice load 108 verifies the line item total 236 value using the quantity 232 and unit price 234 fields.

In addition, invoice load module 108 matches the contract identified in the invoice with a contract stored in contracts 118. The stored contract includes supplier identification information, which is used to validate the supplier identification information in the electronic invoice. The line item detail in the electronic invoice is validated using the stored contract information. For example, the item code, item description and unit of measure line item information of the electronic invoice are validated against the stored contract information. The stored contract rate is used to validate a line item's unit price in the electronic invoice. A line item's allocation code 224 is validated against the information stored in cost allocation 122 of database 116.

In addition, the invoice load 108 examines the amounts entered in field 211 to 214 in cost section 210 of invoice creation window 200 to ensure that subtotal 211, total tax 212 and total freight 213 accurately sum the values for line total 236, tax amount 238 and freight 240 for the line items in line item section 242, and that amount due 214 is the sum of subtotal 211, total tax 212 and total freight 213.

Exceptions identified during invoice validation are noted for reconciliation by the buying organization, or correction by the supplier 101. For example, in a case that invoice load module 108 determines that the invoice is missing required data or contains invalid data, the invoice undergoes exception handling, which may include notifying the supplier 101 to correct the error that caused the exception. In such a case, the supplier 101 is notified (e.g., by electronic mail or via supplier-side user interface 103) and is requested to correct the errors using supplier-side user interface 103, and invoice creation and submission interface 200 and 220.

Notification of an exception that is to be processed by the buying organization is typically forwarded by electronic mail to someone within the organization. The email recipient then accesses EIPCAS 106 to resolve the exception.

Once a submitted invoice is successfully validated by invoice load 108, the invoice is submitted for further processing and payment, and allocation of the costs identified in the electronic invoice. An electronic procurement tool 110, such as Ariba Inc.'s Ariba Buyer, Contracts and Invoice, is used to facilitate processing and payment of the invoice.

Costs are allocated at any time after an invoice is validated, but typically are allocated either after a payment is scheduled or actually paid. Costs are allocated to one or more cost centers using the cost allocation rules stored in cost allocation 114. More particularly, the allocation code from a line item in the electronic invoice is used to select an allocation rule.

As discussed above, more than one allocation rule may be associated with an allocation code. If more than one of the allocation rules is in effect, an exception is raised, and notification of the exception is sent via electronic mail. Upon receipt of the electronic mail, the recipient accesses EIPCAS 106 to mark one of the allocation rules as the appropriate rule, and marks the remaining allocation rules as inactive. A notification is then sent to the EIPCAS 106, which resumes processing of the invoice to allocate the costs.

Using a selected allocation rule, the line item's subtotal, line total 236, tax 238 and freight 240, are split according to a percentage, or percentages, and assigned to each cost center, identified by the allocation rule. Each cost center identified in an allocation rule is to ensure that each cost center identified in the allocation rule is a valid cost center. System 100 then generates accounting entries to update accounting data 124 to reflect the allocated costs.

If an error occurs during cost allocation, e.g., an invalid allocation code, allocation rule, or cost center, the error is reported for automated and/or manual reconciliation.

Costs may be allocated to the appropriate cost centers at anytime with respect to payment of the invoice. For example, costs may be allocated at the time a payment is scheduled but before the payment of the invoice. Alternatively, costs may be allocated after payment of the invoice. According to one approach used in an embodiment of the present invention, costs may initially be allocated to a central, or initial, cost center, and then using the selected allocation code, the costs are reallocated to the appropriate cost center(s). Alternatively, the costs can be allocated to the appropriate cost center(s) without first being allocated to a central cost center.

Figure 3:
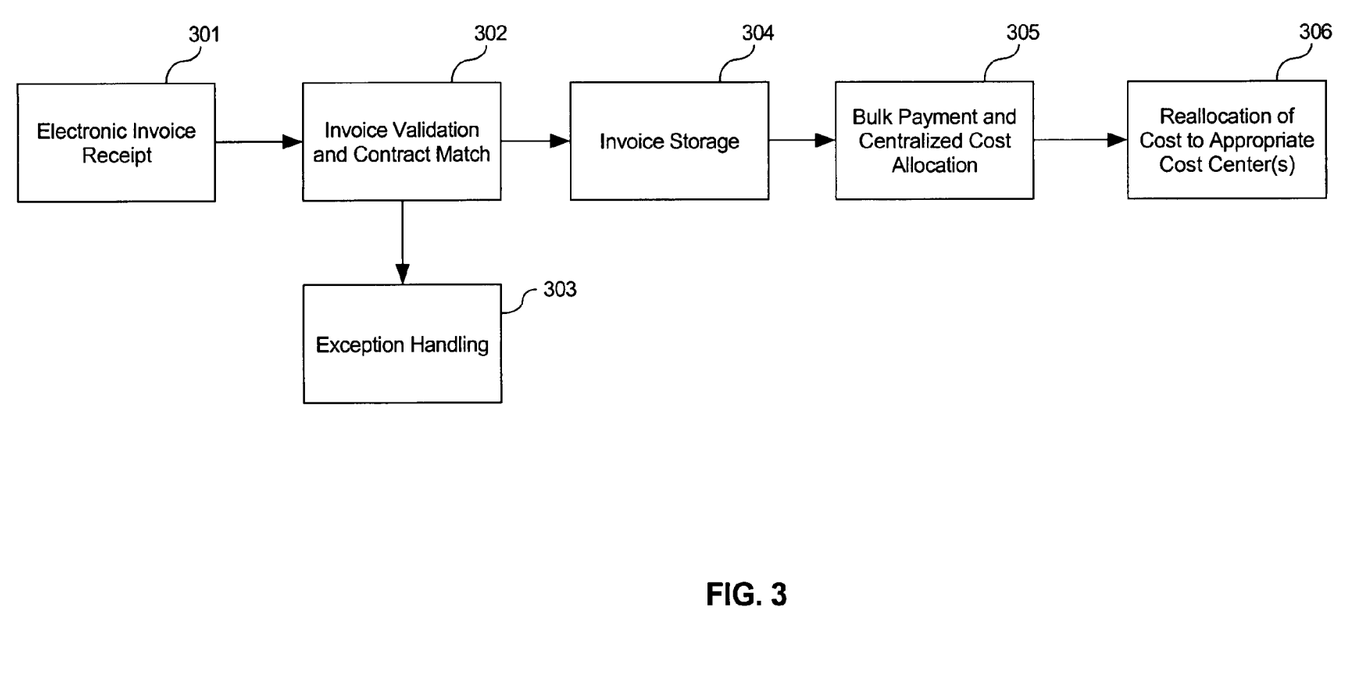
FIG. 3 is a block diagram illustrating a sequence for bulk processing of invoices according to an embodiment of the present invention.

Reallocation of costs from an initial cost center is useful, for example, in a case that invoices are processed for payment in bulk, i.e., in a case that invoices are processed and paid in bulk. FIG. 3 is a block diagram illustrating a sequence for bulk processing of invoices according to an embodiment of the present invention. An electronic invoice received at block 301 undergoes a validation at block 302. Exceptions are handled at exception handling block 303. Valid invoices are stored, such as in invoice 120 of database 116, at block 304. Periodically, unpaid, stored invoices are processed for payment at block 305. At this time, the costs associated with the invoices are allocated to an initial cost center. At block 306, after the invoices are processed for payment, the costs allocated to the initial cost center are reallocated to the appropriate cost centers based on the line item allocation code's 224 identified in each invoice.

III. Process

Figure 4A:
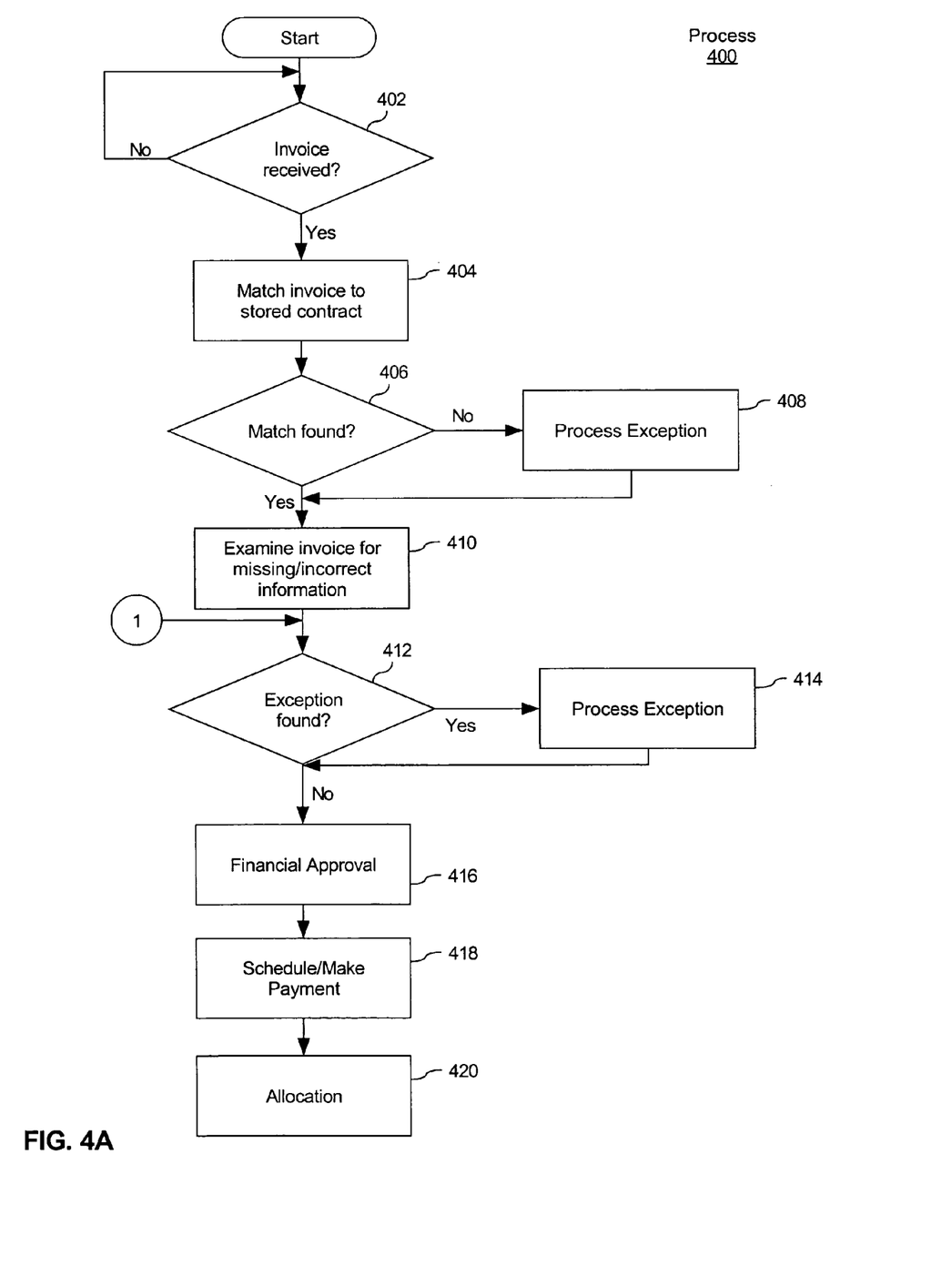
FIGS. 4A and 4B, is a flowchart illustrating an electronic procurement approval, payment and allocation process according to one embodiment of the present invention.
Figure 4B:
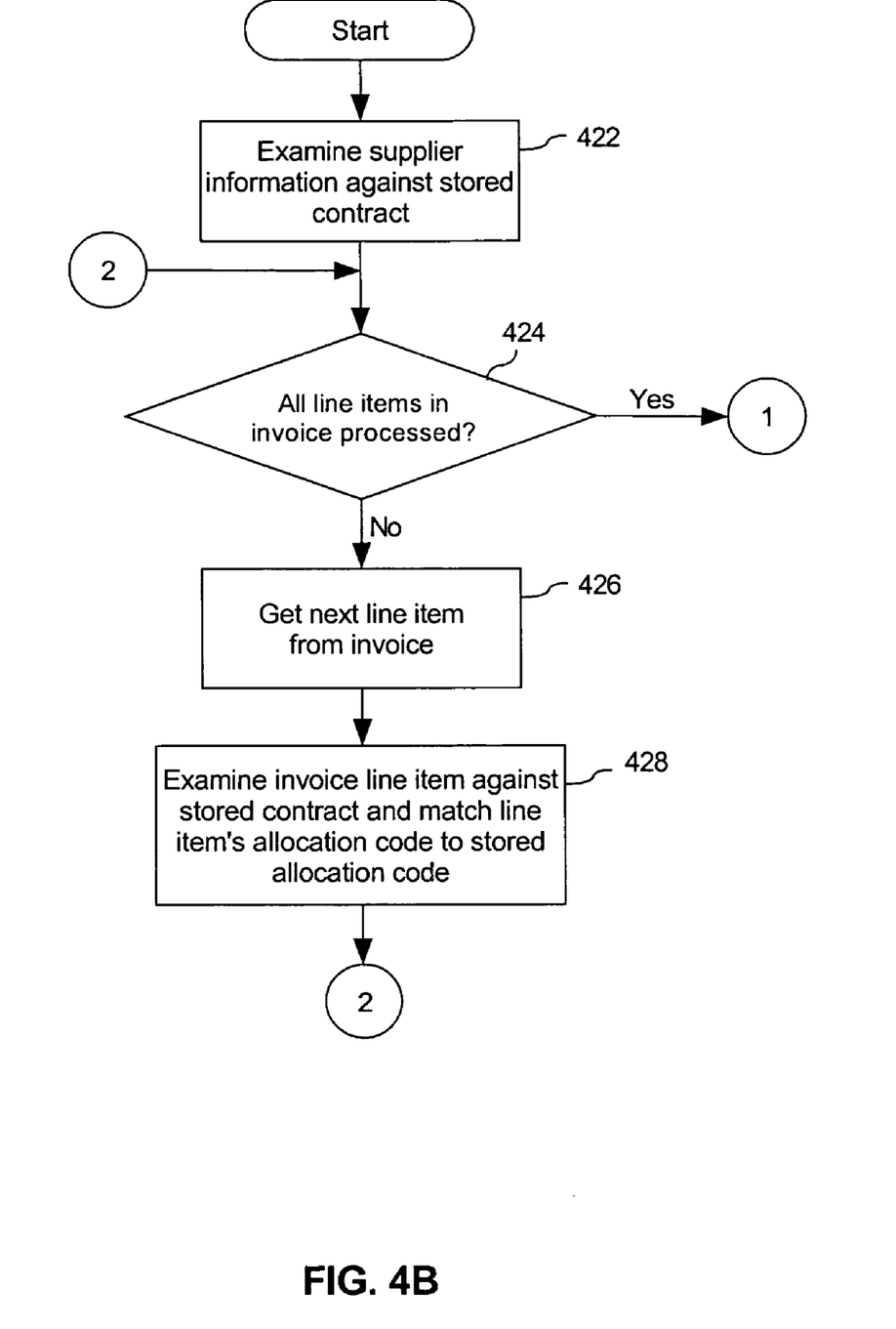

Referring to FIG. 4, which comprises FIGS. 4A and 4B, a flowchart illustrating an electronic procurement approval, payment and allocation process 400, according to one embodiment of the present invention, is shown.

Process 400 begins at step 402 to determine whether an invoice is received, such as in a case that supplier 101 submits an invoice using supplier-side user interface 103. If an invoice is not received, processing waits for receipt of an invoice. If an invoice is received, processing continues at step 404 to match the received invoice to a contract stored in contracts 118. At step 410, the received invoice is examined for missing, invalid or incorrect information. For example, supplier, contract, and/or line item information is examined to identify missing or invalid information. If an exception is identified at step 412, processing continues at step 414 to process the exception. The exception may be processed in a reconciliation process within the buying organization, or by notifying the supplier 101 to correct the invalid information, for example.

If no exception is found at step 412, processing continues at step 416 to obtain financial approval. Thus, once the received invoice has been validated, a notification is sent via electronic mail to someone in the buying organization. Upon receipt of the notification, the recipient reviews the invoice, approves it for payment, and notifies the EIPCAS 106 to schedule payment. At 418, upon notification of approval of the invoice, payment is scheduled and then made. At step 420, the costs identified in the invoice are allocated to the appropriate cost centers. As discussed above, the costs may be allocated before payment is actually made, when payment is scheduled.

As discussed above, at 410, the invoice is examined to ensure that it is valid. FIG. 4B illustrates a process flow for validating an invoice according to one embodiment of the invention. Generally, the information contained in the invoice is validated, including supplier 101 information. In addition, each line item of the invoice is examined and validated.

At 422 of FIG. 4B, the supplier information section 202 is examined against the information contained in the stored contract. At 424, a determination is made whether there are any remaining line items to be processed. If there are remaining invoice line items, processing continues at 426 to get the next line item from the invoice. At 428, the invoice line item is examined against the stored contract. More particularly, the line item detail (e.g., allocation code 224, item code 227, item description 228, unit of measure 230, and unit price 234) is examined against information in the stored contract. Processing continues at 424 to process any remaining line items.

If it is determined at 424 that there are no line items remaining to be processed, processing then continues at 412 of FIG. 4A, where a determination is made whether the examination in 422 and/or 428 caused an exception (e.g., the invoice's allocation code 224 and/or unit price 234 differs from the allocation code and/or unit price information contained in the contract). If so, processing continues at step 414 to process the exception. If there were no exceptions, or once all exceptions are cleared, processing continues at step 416 to obtain financial approval, as described above.

As is discussed above, the costs can be allocated to a central cost center and then re-allocated to the appropriate cost center(s) based on the allocation code identified in the invoice line item detail. Alternatively, the costs may be allocated initially to the appropriate cost center(s). In either case, the costs are allocated to the appropriate cost center(s) in accordance with the allocation code, and an allocation rule associated with the allocation code.

Figure 5:
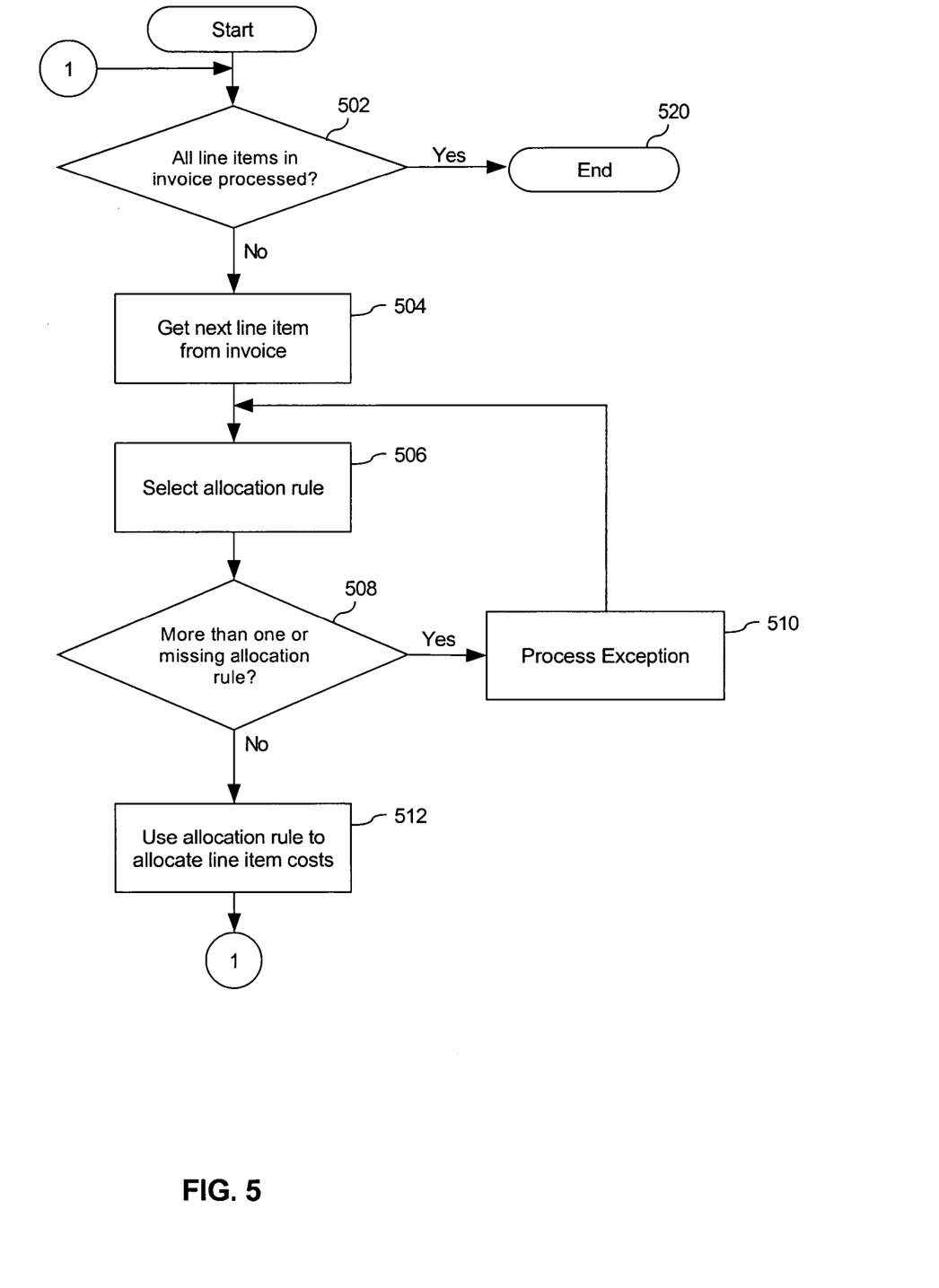
FIG. 5 is a flowchart illustrating an allocation process according to one embodiment of the present invention.

FIG. 5 is a flowchart illustrating an allocation process according to one embodiment of the present invention. Generally, costs identified in an invoice line item are allocated in accordance with the allocation code 224 identified in the line item. More particularly, the allocation code is used to identify one or more allocation rules. An allocation rule that is determined to be in effect with an effective date prior to the processing date is selected to allocate the invoice line item costs. The allocation rule identifies the appropriate cost center, or cost centers, to which the costs are to be allocated. If multiple cost centers are identified in the allocation rule, the allocation rule identifies a percentage of the cost to be allocated to each of the cost centers identified in the rule.

The process shown in FIG. 5 may be performed for a single invoice or for multiple invoices. In the latter case, the process may be used to perform bulk processing of invoices, such as by repeating the process for each invoice, for example.

Referring to FIG. 5A, at step 502, a determination is made whether all of the line items in an invoice have been processed. If so, processing ends at step 520. If not, processing continues at step 504 to get the next invoice line item. At step 506, an allocation rule is selected from cost allocation 122. The selection may result in more than one allocation rule, or the selection may result in no allocation rule, being found.

If it is determined at 508 that there is more than one, or a missing, allocation rule, processing continues at step 510 to handle the exception. As previously discussed, a notification is made and the notification recipient uses cost allocation interface 134 to create an allocation rule, or to identify one of the allocation rules as the rule currently in effect. Upon completion of exception handling at 510, processing continues at 506 and 508 to select an allocation rule and check for an exception caused by the selection.

If selection of an allocation rule did not raise any exception, processing continues at 512. The selected allocation rule is used, at 512, to allocate the line item costs to one or more cost centers based on the cost center and percentage identification provided by the selected allocation rule. Processing then continues at step 502 to process any remaining line items.

IV. Example Implementations

The present invention (i.e., [system 100, process 400] or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 6:
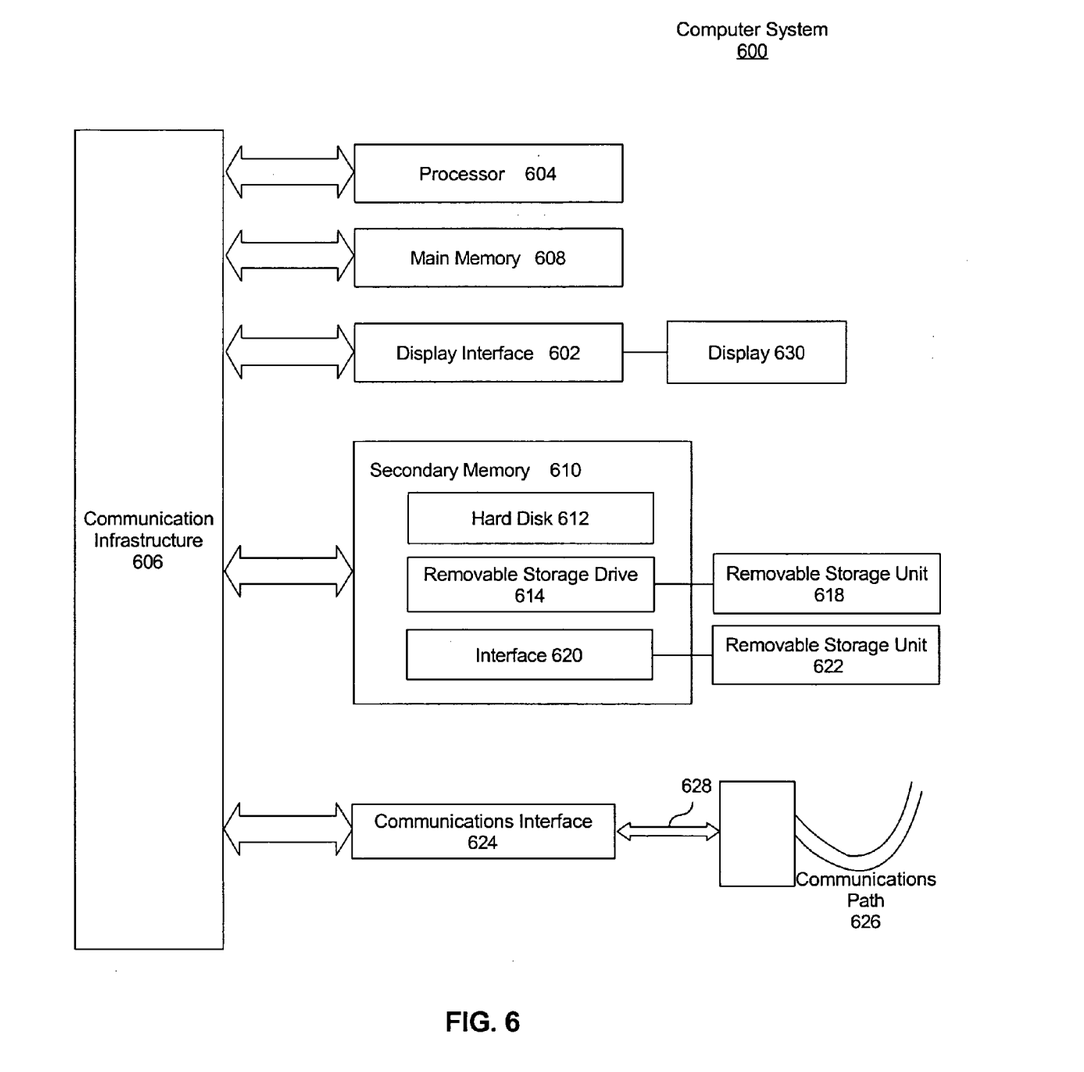
FIG. 6 is a block diagram of an exemplary computer system useful for implementing the present invention.

In fact, in one embodiment, the invention is directed toward one or more computer systems capable of carrying out the functionality described herein. An example of a computer system 600 is shown in FIG. 6.

The computer system 600 includes one or more processors, such as processor 604. The processor 604 is connected to a communication infrastructure 606 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 600 can include a display interface 602 that forwards graphics, text, and other data from the communication infrastructure 606 (or from a frame buffer not shown) for display on the display unit 630.

Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618 represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628 which may be electronic, electromagnetic, optical or other signals capable of being received by communications interface 624. These signals 628 are provided to communications interface 624 via a communications path (e.g., channel) 626. This channel 626 carries signals 628 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 614, a hard disk installed in hard disk drive 612, and signals 628. These computer program products provide software to computer system 600. The invention is directed to such computer program products.

Computer programs (also referred to as computer control logic) are stored in main memory 608 and/or secondary memory 610. Computer programs may also be received via communications interface 624. Such computer programs, when executed, enable the computer system 600 to perform the features of the present invention, as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method for providing approval and allocation of costs associated with purchases from a supplier against a pre-existing electronic procurement contract between the supplier and an organization having a plurality of cost centers, the method comprising:
   receiving, at a computer-based electronic invoice processing system, an electronic invoice from the supplier;
   validating, by the invoice processing system, at least a portion of information in the electronic invoice;
   matching, by the invoice processing system, the electronic invoice with the pre-existing electronic procurement contract;
   validating, by the invoice processing system, rate information included in the electronic invoice information with a contract rate from the pre-existing electronic procurement contract;
   determining, by the invoice processing system, an allocation code associated with the electronic invoice, wherein the allocation code is determined based upon at least one of input received from a user interface, a line item of the electronic invoice and the procurement contract;
   determining an allocation rule based upon the allocation code and an effective date associated with the allocation rule;
   allocating, by the invoice processing system and based upon the allocation rule, costs associated with procurement to at least one of the plurality of cost centers using validated information from the electronic invoice; and
   wherein the pre-existing electronic procurement contract specifies a contractual obligation between the supplier and the organization regarding procurement costs.

2. The method of claim 1, wherein the step of allocating costs includes selecting an allocation rule that identifies the at least one cost center.

3. The method of claim 2, wherein the costs are allocated to more than one of the plurality of cost centers in accordance with a percentage associated with each of the more than one cost centers identified in the selected allocation rule.

4. The method of claim 2, wherein the electronic invoice includes a plurality of input fields, at least one of which is used to input the allocation code.

5. The method of claim 1, wherein the step of allocating costs includes:
   allocating costs to an initial cost center; and
   reallocating the costs allocated to the initial cost center to the at least one of the plurality of cost centers.

6. A system for providing approval and allocation of costs associated with purchases from a supplier against a pre-existing electronic procurement contract between the supplier and an organization having a plurality of cost centers, comprising:
   a network interface communicating with a memory, said network interface configured to receive an electronic invoice from the supplier;
   said memory communicating with a processor; and
   said processor, when executing a computer program, is configured to:
   validate at least a portion of information in the electronic invoice;
   match the electronic invoice with the pre-existing electronic procurement contract;
   validate by the invoice processing system, rate information included in the electronic invoice information with a contract rate from the pre-existing electronic procurement contract;
   determine an allocation code associated with the electronic invoice, wherein the allocation code is determined based upon at least one of input received from a user interface, a line item of the electronic invoice and the procurement contract;
   determine an allocation rule based upon the allocation code and an effective date associated with the allocation rule;
   allocate, based upon the allocation rule, costs associated with procurement to at least one of the plurality of cost centers using validated information from the electronic invoice; and
   wherein the pre-existing electronic procurement contract specifies a contractual obligation between the supplier and the organization regarding procurement costs.

7. The system of claim 6, further comprising a cost allocator comprising a selector operable to select the allocation rule that identifies the at least one cost center.

8. The system of claim 7, wherein the cost allocator is operable to allocate costs to more than one of the plurality of cost centers in accordance with a percentage associated with each of the more than one cost centers identified in the selected allocation rule.

9. The system of claim 7, wherein more than one allocation rule is associated with an allocation code, and
   wherein the selector is operable to select an allocation rule having a closest effective date prior to an invoice processing date.

10. The system of claim 6, wherein the cost allocator includes:
    a first cost allocator operable to allocate costs to an initial cost center; and
    a second cost allocator operable to reallocate the costs allocated to the initial cost center to the at least one of the plurality of cost centers.

11. A non-transitory computer-readable medium (CRM) having computer-executable instructions stored thereon for causing a computer to provide approval and allocation of costs associated with purchases from a supplier against a pre-existing electronic procurement contract between the supplier and an organization having a plurality of cost centers, the executable instructions, if executed by a computer, cause the computer to perform operations comprising:

receiving an electronic invoice from the supplier;

validating at least a portion of information in the electronic invoice;

matching the electronic invoice with the pre-existing electronic procurement contract;

validating rate information included in the electronic invoice information with a contract rate from the pre-existing electronic procurement contract;

determining an allocation code associated with the electronic invoice, wherein the allocation code is determined based upon at least one of input received from a user interface, a line item of the electronic invoice and the procurement contract;

determining an allocation rule based upon the allocation code and an effective date associated with the allocation rule; and allocating, based upon the allocation rule, costs associated with procurement to at least one of the plurality of cost centers using validated information from the electronic invoice, wherein the pre-existing electronic procurement contract specifies a contractual obligation between the supplier and the organization regarding procurement costs.

12. The CRM of claim 11, wherein the executable instructions, if executed by a computer, further cause the computer to perform selecting an allocation rule which identifies the at least one cost center.

13. The CRM of claim 12, the executable instructions, if executed by a computer, further cause the computer to perform allocating the costs to more than one of the plurality of cost centers in accordance with a percentage associated with each of the more than one cost centers identified in the selected allocation rule.

14. The CRM of claim 12, wherein more than one allocation rule is associated with an allocation code, and wherein the executable instructions, if executed by a computer, further cause the computer to perform selecting an allocation rule having a closest effective date prior to an invoice processing date.

15. The CRM of claim 11, wherein the executable instructions, if executed by a computer, further cause the computer to perform:

allocating costs to an initial cost center; and reallocating the costs allocated to the initial cost center to the at least one of the plurality of cost centers.

* * * * *